(12) United States Patent
Han et al.

(10) Patent No.: US 9,231,747 B2
(45) Date of Patent: Jan. 5, 2016

(54) METHOD AND APPARATUS FOR TRANSMITTING WIRELESS FRAME, AND COMMUNICATION NETWORK ELEMENT

(75) Inventors: Zhiqiang Han, Shenzhen (CN); Jing Jiang, Shenzhen (CN); Bo Sun, Shenzhen (CN); Li Zhang, Shenzhen (CN); Weimin Xing, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 142 days.

(21) Appl. No.: 14/118,893

(22) PCT Filed: Apr. 16, 2012

(86) PCT No.: PCT/CN2012/074148
§ 371 (c)(1),
(2), (4) Date: Jan. 2, 2014

(87) PCT Pub. No.: WO2012/155741
PCT Pub. Date: Nov. 22, 2012

(65) Prior Publication Data
US 2014/0126405 A1  May 8, 2014

(30) Foreign Application Priority Data
May 13, 2011 (CN) .......................... 2011 1 0124390

(51) Int. Cl.
*H04L 5/00* (2006.01)
*H04W 72/04* (2009.01)
(Continued)

(52) U.S. Cl.
CPC ............... *H04L 5/0057* (2013.01); *H04W 4/02* (2013.01); *H04W 24/02* (2013.01);
(Continued)

(58) Field of Classification Search
CPC ... H04L 1/0026; H04L 1/0027; H04L 1/0028; H04L 1/0003; H04L 25/0204; H04L 25/0228; H04L 5/0057; H04B 7/0695; H04W 24/02
USPC ................................................. 370/252, 329
See application file for complete search history.

(56) References Cited

U.S. PATENT DOCUMENTS

| 8,200,164 B2 | 6/2012 | Trainin et al. |
| 2005/0041622 A1* | 2/2005 | Dubuc .................. H04L 1/0026 370/332 |

(Continued)

FOREIGN PATENT DOCUMENTS

| CN | 101361308 A | 2/2009 |
| CN | 101395855 A | 3/2009 |
| CN | 101651998 A | 2/2010 |

OTHER PUBLICATIONS

International Search Report in international application No. PCT/CN2012/074148, mailed on Aug. 9, 2012. (2 pages—see entire document).

(Continued)

*Primary Examiner* — Jae Y Lee
*Assistant Examiner* — Jean F Voltaire
(74) *Attorney, Agent, or Firm* — Oppedahl Patent Law Firm LLC

(57) ABSTRACT

It is disclosed a method for transmitting wireless frame, including: the wireless frame is transmitted by using any access category. The wireless frame is a beginning frame for performing channel information measurement. It is further disclosed an apparatus for transmitting wireless frame, including: a selection unit and a transmitting unit, where the selection unit is configured to select any access category for a beginning frame for performing the channel information measurement; and the transmitting unit is configured to transmit the beginning frame. It is further disclosed a communication network element provided with the apparatus for transmitting wireless frame mentioned above. It is ensured that the wireless frames subsequent to the frame exchange sequence for performing the channel information measurement may be smoothly transmitted, and the channel information measurement may be smoothly performed, and thereby transmitting communication data based on the acquired channel information. The support of each communication network elements to the MIMO and beam forming is further ensured, and an effective supplement to the existing protocols is provided.

10 Claims, 1 Drawing Sheet

(51) Int. Cl.
*H04W 36/38* (2009.01)
*H04W 4/02* (2009.01)
*H04W 36/00* (2009.01)
*H04W 24/02* (2009.01)
*H04B 7/26* (2006.01)
*H04B 7/06* (2006.01)

(52) U.S. Cl.
CPC ......... *H04W 36/0088* (2013.01); *H04W 36/38* (2013.01); *H04W 72/04* (2013.01); *H04W 72/0446* (2013.01); *H04B 7/0695* (2013.01); *H04B 7/2643* (2013.01); *H04B 7/2656* (2013.01)

(56) References Cited

U.S. PATENT DOCUMENTS

| | | | |
|---|---|---|---|
| 2006/0126577 A1* | 6/2006 | Yano | H04W 36/0088 370/337 |
| 2006/0182145 A1* | 8/2006 | Seo | H04B 7/2631 370/471 |
| 2007/0129018 A1 | 6/2007 | Trainin et al. | |
| 2007/0195811 A1 | 8/2007 | Basson et al. | |
| 2007/0258384 A1 | 11/2007 | Sammour et al. | |
| 2008/0019321 A1* | 1/2008 | Kim | H04B 7/2606 370/332 |
| 2010/0039982 A1 | 2/2010 | Itagaki et al. | |
| 2010/0189024 A1 | 7/2010 | Xhafa et al. | |
| 2011/0051657 A1* | 3/2011 | Li | H04L 1/0026 370/328 |
| 2013/0058273 A1* | 3/2013 | Wentink | H04B 7/0452 370/328 |

OTHER PUBLICATIONS

English Translation of the Written Opinion of the International Search Authority in international application No. PCT/CN2012/074148, mailed on Aug. 9, 2012. (10 pages—see entire document).

* cited by examiner

METHOD AND APPARATUS FOR TRANSMITTING WIRELESS FRAME, AND COMMUNICATION NETWORK ELEMENT

TECHNICAL FIELD

The present disclosure relates to wireless frame transmission techniques, and in particular to a method and apparatus for transmitting wireless frame for performing channel information measurement and a communication network element.

BACKGROUND

At present, with the rapid development of the Wireless Local Area Networks (WLAN) in the field of the wireless networks, demands for WLAN coverage have been ever increasing, and meanwhile throughput has been more demanding than ever before. In the Institute of Electrical and Electronics Engineers (IEEE) industrial standard IEEE802.11 task group, a series of standard WLAN techniques such as 802.11a, 802.11b, 802.11g are defined successively. Then other task groups emerging successively devote themselves to developing the standard involving an improvement on the existing 802.11 techniques. For example, a 802.11n task group puts forwards a requirement on High Throughput (HT) which supports a data rate of up to 600 Mbps, and a 802.11ac task group further puts forwards a Very High Throughput (VHT) concept by which the data rate is enhanced to 1 Gbps by introducing a greater channel bandwidth.

In the 802.11 task groups, a Basic Service Set (BSS) is composed of an Access Point (AP) and multiple Stations (STAs) associated with the AP. The 802.11 task groups define two operating modes: a Distributed Coordination Function (DCF) and a Point Coordination Function (PCF) and improvements for these two operating modes: an Enhanced Distributed Channel Access (EDCA) and a Hybrid Coordination function controlled Channel Access (HCCA), where both the DCF and the EDCA allow the multiple stations to share a wireless channel by employing Carrier Sense Multiple Access with Collision Avoidance (CSMA/CA). The difference between the above two operating modes is that: the EDCA is applied to a frame transmission with a Quality of Service (QoS) requirement, while the HCCA is applied to a frame transmission without a QoS requirement. Four Access Categories (ACs) are specified in a wireless local area network, i.e., AC_VO, AC_VI, AC_BE and AC_BK. A User Priority (UP) of a MAC Service Data Unit (MSDU) has a mapping relationship with the four ACs, and each AC corresponds to a group of EDCA parameter set. In this way, a wireless frame with a certain priority requirement employs a parameter set of the AC corresponding to the UP to contend for a channel to acquire a Transmission Opportunity (TXOP). The basic process that the access categories with different priorities acquire TXOP is that: when a channel is idle, the access categories each use different backoff intervals and any contention backoff window to access the channel to reduce the collision.

In an existing art, a Multiple Input Multiple Output (MIMO) is introduced to improve transmission performance of the WLAN. In order to enable the data to be transmitted reliably and effectively, a transmitting party needs to measure channel conditions of one or more receiving parties, and configure transmission parameters based on the measured channel information.

In the existing art, when the wireless frame is transmitted between the AP and the STA, a multi-antenna and beam forming techniques may be employed. For example, the AP, when performing downstream MIMO transmission, may inform the STA to perform channel measurement and to feed a measured result back to the AP. The AP calculates a steering matrix based on the measured result, thus optimizing reception of the receiving parties. Generally, the transmitting party that uses the steering matrix is referred to as a beamformer, and the receiving party is referred to as a beamformee. FIG. 1 is flow chart illustrating a processing of channel information feedback. As shown in FIG. 1, the feedback process of channel information between the beamformer and the beamformee is that: the beamformer transmits a Null Data Packet Announcement (NDPA) frame used for informing the beamformee to perform the channel measurement, and waits for a Short Interframe Space (SIFS) to transmit a Null Data Packet (NDP) after transmitting the NDPA. Information on one or more beamformees to be performed the channel measurement is carried in the NDPA frame. The beginning beamformee in the NDPA waits for the SIFS to reply a VHT Compressed Beamforming frame after receiving the NDP frame. If information on more beamformees is carried in the NDPA, then other beamformees feed back the VHT Compressed Beamforming frame after receiving a Sounding Poll from the beamformer.

The existing art provides that the Access Category of AC_VO needs to be used when a management frame is transmitted; when a Request To Send (RTS) or a Clear To Send (CTS) is used as a beginning frame of a frame exchange sequence, the RTS or CTS should follow the Access Category which is used by subsequent data in the same exchange sequence. However, when the channel information measurement is introduced, there is no provision in the existing art which Access Category should be used by an announcement frame (e.g., the NDPA) for the channel information measurement. This undoubtedly results in an inconvenience for transmitting the wireless frame used for the channel information measurement, and when serious, this may result in that the data cannot be transmitted since the channel information cannot be known.

SUMMARY

According to an aspect of the disclosure, the disclosure provides a method and apparatus for transmitting a wireless frame, and a communication network frame, which can determine an access category for a wireless frame for measuring channel information to be transmitted, thus ensuring to smoothly measure the channel information.

For this purpose, the technical solutions of the present disclosure are implemented as follows.

A method for transmitting wireless frame, including:

the wireless frame is transmitted by using any access category.

Preferably, the wireless frame may be a beginning frame of a frame exchange sequence for measuring and reporting the channel information, i.e., an announcement frame for informing a channel information feedback party.

Preferably, the method may further include:

in a multi-frame exchange sequence for performing the channel information measurement, another wireless frame which is transmitted by the beginning frame's transmitting party is transmitted by using the same access category as that of the beginning frame.

Preferably, the wireless frame is transmitted by using any access category may be:

when there is no data to be transmitted in a data queue for a certain access category, the beginning frame may be transmitted by using the access category.

Preferably, the wireless frame is transmitted by using any access category may be:

when there is no data to be transmitted in a data queue for more than two access categories, the beginning frame may be transmitted by using an access category with a highest priority.

Preferably, the beginning frame may be a Null Data Packet Announcement (NDPA) frame or a Sounding Poll frame.

Preferably, the method may further include:

before the beginning frame is transmitted, a Request To Send (RTS) or a Clear To Send (CTS) may be transmitted by using a same access category as that used for transmitting the beginning frame.

Preferably, the access category may include at least one of the following:

AC_VO, AC_VI, AC_BE and AC_BK.

An apparatus for transmitting wireless frame, including: a selection unit and a transmitting unit, where, the selection unit is configured to select any access category for a beginning frame used for performing channel information measurement; and the transmitting unit is configured to transmit the beginning frame.

Preferably, the selection unit may be further configured to, in a multi-frame exchange sequence for performing the channel information measurement, select a same access category as that of the beginning frame for another wireless frame which is transmitted by the beginning frame's transmitting party.

Preferably, the selection unit may be further configured to, when there is no data to be transmitted in a data queue for a certain access category, select the access category, and transmit the beginning frame through the transmitting unit.

Alternatively, the selection unit may be further configured to, when there is no data to be transmitted in a data queue for more than two access categories, select an access category with a highest priority, and transmit the beginning frame through the transmitting unit.

Preferably, the beginning frame may be a Null Data Packet Announcement (NDPA) frame or a Sounding Poll frame.

A communication network element provided with the above-claimed apparatus.

According to the present disclosure, the access category is set for the beginning frame for performing the channel information measurement, thus ensuring that wireless frames subsequent to the frame exchange sequence for performing the channel information measurement may be smoothly transmitted, and that the channel information measurement may be smoothly performed, and thereby transmitting communication data based on the acquired channel information. Through the present disclosure, the support of each communication network elements to the MIMO and beam forming is ensured, and an effective supplement to the existing protocols is provided.

DETAILED DESCRIPTION

Figure 1:
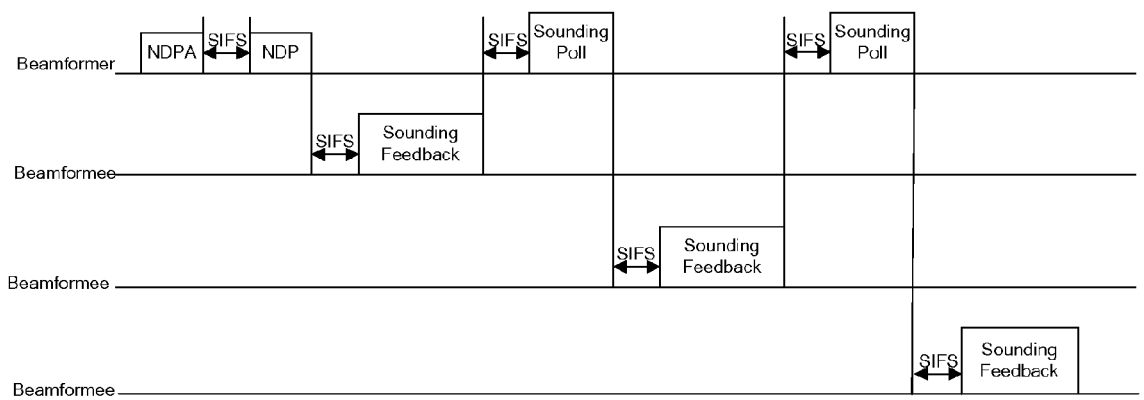
FIG. 1 is a flow chart illustrating a processing of channel information feedback.

According to embodiments of the present disclosure, an access category is set for a beginning frame used for a channel information measurement, thus ensuring that wireless frames subsequent to a frame exchange sequence for performing the channel information measurement is smoothly transmitted, and the channel information measurement is smoothly performed, and further a data transmitting network element can smoothly transmit communication data based on the acquired channel information.

In a method for transmitting wireless frame of the present disclosure, a wireless frame in a process of the channel information measurement is transmitted by using any access category. The wireless frame refers to a beginning frame of a multi-frame exchange sequence for measuring and reporting the channel information, i.e., an announcement frame for informing a channel information feedback party. In the multi-frame exchange sequence for measuring and reporting the channel information, another wireless frame which is transmitted by the wireless frame's transmitting party is transmitted by using the same access category as this wireless frame mentioned above. Any access category mentioned above may be any one of the AC_VI, AC_VO, AC_BE and AC_BK. The exchange of other frames (RTS or CTS) is performed by using the access category which is the same as that of the above wireless frame prior to the multi-frame exchange sequence for measuring and reporting the channel information.

To make the purpose, the technical solutions as well as the advantages of the present disclosure more clear, the present disclosure will be further elaborated below by illustrating embodiments with reference to the accompanying drawings.

A First Embodiment

It is assumed that there are six stations in a BSS: one AP and five STAs (STA1, STA2, STA3, STA4, STA5). At a certain moment, no data in each of access categories needs to be transmitted by the AP, while channel information measurement needs to be performed by the AP for the STA1, STA2. The AP randomly selects an access category, e.g., AC_BE, to transmit a NDPA. When a channel is contended for by the AC_BE, the NDPA is transmitted to perform the channel information measurement for the STA1, STA2. The same access category is used for a subsequent Sounding Poll frame as that of the NDPA. In order to make the data transmission in a TXOP more reliable, a RTS or CTS may be transmitted prior to the channel information measurement. The same access category, i.e., AC_BE, is used for the RTS or CTS as that of the NDPA.

A Second Embodiment

The embodiment employs a transmission method in a process of a channel information measurement of the present disclosure. In the embodiment, the transmission in the process of the channel information measurement is mainly implemented by the following steps.

It is assumed that there are six stations in a BSS: one AP and five STAs (STA1, STA2, STA3, STA4, STA5). At a certain moment, no data in each of access categories needs to be transmitted by the AP, while channel information measurement needs to be performed by the AP for the STA1, STA2. The AP preferably uses an access category AC_VO with a highest priority to transmit a NDPA. When a channel is contended for by the AC_VO, the NDPA is transmitted to perform the channel information measurement for the STA1, STA2. The same access category is used for a subsequent Sounding Poll frame as that of the NDPA. In order to make the data transmission in a TXOP more reliable, a RTS or CTS may be transmitted prior to the channel information measurement. The same access category, i.e., AC_VO, is used for the RTS or CTS as that of the NDPA.

A Third Embodiment

It is assumed that there is one AP and any number of STAs in a BSS. At a certain moment, there is data to be transmitted in access categories of the AP AC_VO, AC_BE, AC_BK, and the AP needs to perform channel information measurement for a STA3. The AP uses an access category AC_VI to transmit a NDPA. When a channel is contended for by the AC_VI, the NDPA is transmitted to perform the channel information measurement for the STA3.

A Fourth Embodiment

It is assumed that there are three stations in a BSS: AP, STA1 and STA2. There is data, a destination address of which is the STA1, in an access category AC_VI of the AP. When a channel is contended for by the AC_VI, if the AP does not have channel information of the STA1, it may transmit a NDPA to perform the channel information measurement for the STA3 firstly, and select appropriate transmission parameters based on measured channel information to transmit the data of the STA1.

A Fifth Embodiment

It is assumed that there are several STAs in a BSS. At a certain moment, there is data, destination stations of which are STA1, STA2 and STA3, respectively, in access categories AC_VI, AC_VO and AC_BK of an AP, respectively. When a channel is contended for by the AC_VI of the AP, the data of the STA1, STA2 and STA3 is packaged and transmitted by using an MU-MIMO. However, there is no channel information for the STA1 and STA2, or channel information for the STA1 and STA2 has been invalid. In order to ensure a reliable data transmission, the channel information measurement may be performed prior to the data transmission. The AP uses the access category AC_VI to transmit a NDPA to start measuring the channel information for the STA1 and STA2. The access category AC_VI is also used for a subsequent Sounding Poll frame. In order to make the data transmission in a TXOP more reliable, a RTS or CTS may be transmitted prior to the channel information measurement. The same access category, i.e., AC_VI, is used for the RTS or CTS as that of the NDPA.

Figure 2:
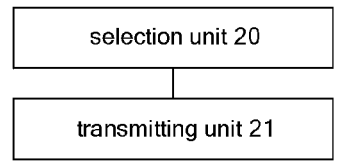
FIG. 2 is a schematic diagram illustrating a structure of an apparatus for transmitting wireless frame of the present disclosure.

FIG. 2 is a schematic diagram illustrating a structure of an apparatus for transmitting wireless frame of the present disclosure. As shown in FIG. 2, the apparatus for transmitting wireless frame of the present disclosure includes a selection unit 20 and a transmitting unit 21, where:

the selection unit 20 is configured to select any access category for a beginning frame for performing channel information measurement; and the transmitting unit 21 is configured to transmit the beginning frame.

The selection unit 20 may be further configured to, in a multi-frame exchange sequence for performing the channel information measurement, select a same access category as that of the beginning frame for another wireless frame which is transmitted by the beginning frame's transmitting party.

The selection unit 20 may be further configured to, when there is no data to be transmitted in a data queue for a certain access category, select the access category, and transmit the beginning frame through the transmitting unit 21.

Alternatively, the selection unit 20 may be further configured to, when there is no data to be transmitted in a data queue for more than two access categories, select an access category with a highest priority, and transmit the beginning frame through the transmitting unit 21.

The beginning frame may be a NDPA frame or a Sounding Poll frame.

It should be noted that functions of each processing unit in the apparatus for transmitting wireless frame as shown in FIG. 2 may be understood with reference to the related description of the beginning embodiment to the fifth embodiment mentioned above, and may be implemented through a program operated on a processor or a specific logical circuit.

The present disclosure further discloses a communication network element provided with the apparatus for transmitting wireless frame as shown in FIG. 2.

What described are merely preferred embodiments of the present disclosure, and are not intended to limit the scope of the present disclosure.

INDUSTRIAL APPLICABILITY

According to the present disclosure, the access category is set for the beginning frame for performing the channel information measurement, thus ensuring that the wireless frames subsequent to the frame exchange sequence for measuring the channel information may be smoothly transmitted, and that the channel information measurement may be smoothly performed, and thereby transmitting the communication data based on the acquired channel information.

The invention claimed is:

1. A method for wireless communication between an access point (AP) and one or more stations (STA) in a wireless local area network (WLAN), comprising:
    selecting, by the AP, an access category from a plurality of access categories comprising at least one of the following: Access Category voice (AC_VO), Access Category video (AC_VI), Access Category besteffort (AC_BE) and Access Category background (AC_BK);
    transmitting, by the AP using the selected access category, a wireless frame, to at least one of the STAs, so as to notify the STA to measure channel information;
    receiving, by the AP, the measured channel information from the STA;
    initiating, by the AP, data communication to the STA based on the received channel information,
    wherein the wireless frame is a beginning frame of a frame exchange sequence for performing channel information measurement.

2. The method according to claim 1, further comprising:
    in a multi-frame exchange sequence for performing the channel information measurement, transmitting another wireless frame which is transmitted by the beginning frame's transmitting party by using the same access category as that of the beginning frame.

3. The method according to claim 1, wherein the transmitting the wireless frame by using any access category comprises:
    when there is no data to be transmitted in a data queue for a certain access category, transmitting the beginning frame by using the access category.

4. The method according to claim 1, wherein the transmitting the wireless frame by using any access category comprises:
    when there is no data to be transmitted in a data queue for more than two access categories, transmitting the beginning frame by using an access category with a highest priority.

5. The method according to claim 1, further comprising:
before transmitting the beginning frame, transmitting a Request To Send (RTS) or a Clear To Send (CTS) by using a same access category as that used for transmitting the beginning frame.

6. The method according to claim 1, wherein the beginning frame is a Null Data Packet Announcement (NDPA) frame or a Sounding Poll frame.

7. An access point (AP), comprising:
a processor, and
a memory containing programs, which when executed, cause the processor to:
select an access category from a plurality of access categories comprising at least one of the following: Access Category voice (AC_VO), Access Category video (AC_VI), Access Category besteffort (AC_BE) and Access Category background (AC_BK);
transmit a wireless frame to at least one of the STAs using the selected access category, so as to notify the STA to measure channel information;
receive the measured channel information from the STA;
initiate data communication to the STA based on the received channel information, wherein the wireless frame is a beginning frame of a frame exchange sequence for performing channel information measurement.

8. The AP according to claim 7, wherein in a multi-frame exchange sequence for performing the channel information measurement, a same access category is selected as that of the beginning frame for another wireless frame which is transmitted by the beginning frame's transmitting party.

9. The AP according to claim 7, wherein the there is no data to be transmitted in a data queue for a certain access category, the access category is selected, and the beginning frame is transmitted; or
when there is no data to be transmitted in a data queue for more than two access categories, an access category with a highest priority is selected, and the beginning frame is transmitted.

10. The AP according to claim 7, wherein the beginning frame is a Null Data Packet Announcement (NDPA) frame or a Sounding Poll frame.

* * * * *